US012686078B2

(12) United States Patent
Ito

(10) Patent No.: US 12,686,078 B2
(45) Date of Patent: Jul. 21, 2026

(54) ATTENUATOR DEVICE AND LASER PROCESSING APPARATUS

(71) Applicant: HAMAMATSU PHOTONICS K.K., Hamamatsu (JP)

(72) Inventor: Haruyasu Ito, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 730 days.

(21) Appl. No.: 18/010,272

(22) PCT Filed: Apr. 19, 2021

(86) PCT No.: PCT/JP2021/015881
§ 371 (c)(1),
(2) Date: Dec. 14, 2022

(87) PCT Pub. No.: WO2022/018917
PCT Pub. Date: Jan. 27, 2022

(65) Prior Publication Data
US 2024/0033849 A1     Feb. 1, 2024

(30) Foreign Application Priority Data
Jul. 21, 2020     (JP) ................................. 2020-124684

(51) Int. Cl.
*B23K 26/064*     (2014.01)
*G02B 5/30*     (2006.01)
*G02B 27/28*     (2006.01)

(52) U.S. Cl.
CPC ........ *B23K 26/0648* (2013.01); *G02B 5/3066* (2013.01); *G02B 27/281* (2013.01)

(58) Field of Classification Search
CPC .............. B23K 26/0648; G02B 27/281; G02B 5/3066; G02B 26/023; G02B 5/3083
See application file for complete search history.

(56) References Cited

U.S. PATENT DOCUMENTS 3,655,268 A     4/1972  Reynolds
2006/0013271 A1*  1/2006  Wang ..................... A61B 18/20
372/27

FOREIGN PATENT DOCUMENTS

CN     203705729 U     7/2014
CN     103984112 A     8/2014
(Continued)

OTHER PUBLICATIONS

Machine Translation of Xiao et al (CN 103984112), performed Sep. 25, 2025 (Year: 2014).*
(Continued)

*Primary Examiner* — Brian W Jennison
(74) *Attorney, Agent, or Firm* — Faegre Drinker Biddle & Reath LLP

(57)     ABSTRACT

An attenuator device includes: a first window pair including a pair of first windows having a pair of first surfaces extending to form a Brewster's angle with an optical axis; a rotation holding portion which holds the first window pair to be rotatable around the optical axis; a second window pair including a pair of second windows having a pair of second surfaces extending to form a Brewster's angle with the optical axis; and a λ/4 phase element which gives a phase difference of λ/4 between a polarized component parallel to an optical axis and a polarized component orthogonal to the optical axis when a wavelength of laser light is λ. The second window pair is disposed so that a vibration direction of a P-polarized component transmitted through the second window pair is inclined with respect to the optical axis of the λ/4 phase element by 45°.

9 Claims, 8 Drawing Sheets

(56)     References Cited

FOREIGN PATENT DOCUMENTS

| | | | |
|---|---|---|---|
| CN | 207606395 | U | 7/2018 |
| JP | S49-016000 | Y1 | 4/1974 |
| JP | S59-228207 | A | 12/1984 |
| JP | H6-206295 | A | 7/1994 |
| JP | H11-258526 | A | 9/1999 |
| JP | 2007-225905 | A | 9/2007 |
| KR | 10-2011-0034338 | A | 4/2011 |

OTHER PUBLICATIONS

International Preliminary Report on Patentability mailed Feb. 2, 2023 for PCT/JP2021/015881.

* cited by examiner

Figure 5:
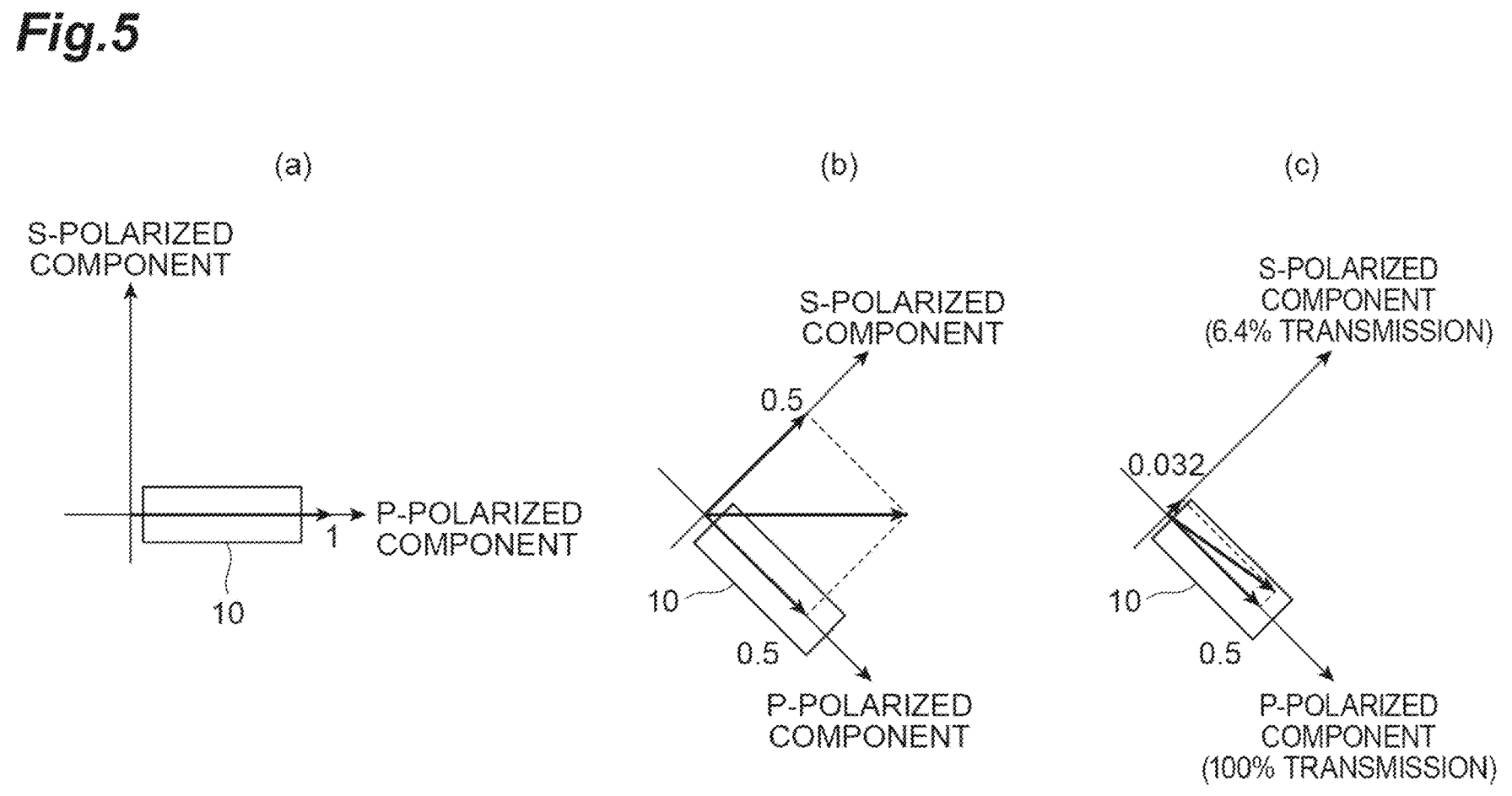

S-POLARIZED
COMPONENT

P-POLARIZED
COMPONENT

1

10

(b)

S-POLARIZED
COMPONENT

P-POLARIZED
COMPONENT 0.5

0.5

10

(c)

S-POLARIZED
COMPONENT
(6.4% TRANSMISSION)

P-POLARIZED
COMPONENT
(100% TRANSMISSION)

0.032

0.5

10

ATTENUATOR DEVICE AND LASER PROCESSING APPARATUS

TECHNICAL FIELD

An aspect of the present disclosure relates to an attenuator device and a laser processing apparatus.

BACKGROUND ART

As an attenuator for attenuating laser light, for example, there is one described in Patent Literature 1. The attenuator described in Patent Literature 1 includes a pair of windows arranged in a V shape to form a Brewster's angle with an optical axis. In a surface of the window disposed in this way, approximately 100% of a P-polarized component is transmitted, while only about 50% of an S-polarized component is transmitted. Therefore, most of the S-polarized component can be removed and the laser light can be attenuated by causing the laser light to pass through a total of four surfaces of the pair of windows. Further, it is possible to change the ratio of the transmission component by rotating the pair of windows around the optical axis and to change the attenuation rate of the laser light.

CITATION LIST

Patent Literature

Patent Literature 1: U.S. Pat. No. 3,655,268

SUMMARY OF INVENTION

Technical Problem

For example, it is conceivable to apply the above-described attenuator to, for example, a laser processing apparatus. In the laser processing apparatus, if laser light reflected by a workpiece travels backward along a transmission path and returns to a laser oscillator, it may cause damage to the oscillator or destabilization of the oscillation output. Therefore, it is required to suppress such return light.

An aspect of the present disclosure is to provide an attenuator device that can suitably attenuate laser light and suppress return light and a laser processing apparatus including such an attenuator device.

Solution to Problem

An attenuator device according to an aspect of the present disclosure includes: a first window pair which includes a pair of first windows on which laser light is incident along an optical axis, each of the pair of first windows including a pair of first surfaces extending to form a Brewster's angle with the optical axis, one pair of first surfaces of the pair of first windows is inclined on a side opposite to the other pair of first surfaces of the pair of first windows with respect to the optical axis; a rotation holding portion which holds the first window pair so that the first window pair is rotatable around the optical axis; a second window pair which includes a pair of second windows, each of the pair of second windows including a pair of second surfaces extending to form a Brewster's angle with the optical axis, one pair of second surfaces of the pair of second windows is inclined on a side opposite to the other pair of second surfaces of the pair of second windows with respect to the optical axis; and a λ/4 phase element which is disposed so that the laser light is incident after passing through the first window pair and the second window pair in this order and gives a phase difference of λ/4 between a polarized component parallel to an optical axis and a polarized component orthogonal to the optical axis when a wavelength of the laser light is λ, wherein the second window pair is disposed so that a vibration direction of a P-polarized component transmitted through the second window pair is inclined with respect to the optical axis of the λ/4 phase element by 45° when viewed from a direction parallel to the optical axis.

In this attenuator device, the laser light passes through the pair of first windows and the pair of second windows. Each first window includes the pair of first surfaces which extends to form the Brewster's angle with the optical axis and each second window includes the pair of second surfaces which extends to form the Brewster's angle with the optical axis. Thus, the laser light passes through a total of eight surfaces extending to form the Brewster's angle with the optical axis. Accordingly, the laser light can be attenuated. Further, the first window pair is held by the rotation holding portion to be rotatable around the optical axis. Accordingly, it is possible to change the attenuation rate of the laser light by rotating the first window pair. Particularly, in this attenuator device, since the laser light is attenuated by a total of eight surfaces, a large attenuation range can be secured and the attenuation rate can be greatly changed. Further, the laser light having passed through the first window pair and the second window pair in this order is incident on the λ/4 phase element that gives a phase difference of λ/4 between the polarized component parallel to the optical axis and the polarized component orthogonal to the optical axis. Here, the second window pair is disposed so that the vibration direction of the P-polarized component transmitted through the second window pair is inclined with respect to the optical axis of the λ/4 phase element by 45° when viewed from a direction parallel to the optical axis. Accordingly, the second window pair and the λ/4 phase element function as an isolator and the return light can be removed. Thus, according to this attenuator device, it is possible to suitably attenuate the laser light and to suppress the return light.

The first window pair, the rotation holding portion, and the second window pair may be fixed to each other to form one unit. In this case, it is possible to easily handle the attenuator device.

The first window pair and the second window pair may be disposed inside one housing. In this case, it is possible to more easily handle the attenuator device. Further, the laser light reflected by the first window pair and the second window pair can be kept within the housing.

The housing may be provided with a heat dissipation structure. In this case, it is possible to effectively dissipate heat caused by the laser light reflected by the first window pair and the second window pair.

The attenuator device according to an aspect of the present disclosure may further include a controller which controls the rotation holding portion so that a rotation angle of the first window pair is to be a rotation angle in accordance with a target intensity. In this case, the attenuation rate of laser light can be adjusted to the attenuation rate in accordance with the target intensity.

The controller may control the rotation holding portion so that the rotation angle of the first window pair is to be a rotation angle in accordance with a target intensity based on a relationship between the rotation angle of the first window pair and an attenuation rate of the laser light due to the first window pair and the second window pair. In this case, the attenuation rate of the laser light can be reliably adjusted to the attenuation rate according to the target intensity.

A laser processing apparatus according to an aspect of the present disclosure includes a light source which outputs the laser light and the attenuator device. According to this laser processing apparatus, for the above-described reasons, it is possible to suitably attenuate the laser light and to suppress the return light.

Advantageous Effects of Invention

According to an aspect of the present disclosure, it is possible to provide an attenuator device and a laser processing apparatus that can suitably attenuate laser light and suppress return light.

BRIEF DESCRIPTION OF DRAWINGS

FIGS. 5(a) to 5(c) are diagrams showing a change in ratio of a transmission component when a first window pair is rotated.

DESCRIPTION OF EMBODIMENTS

Figure 1:
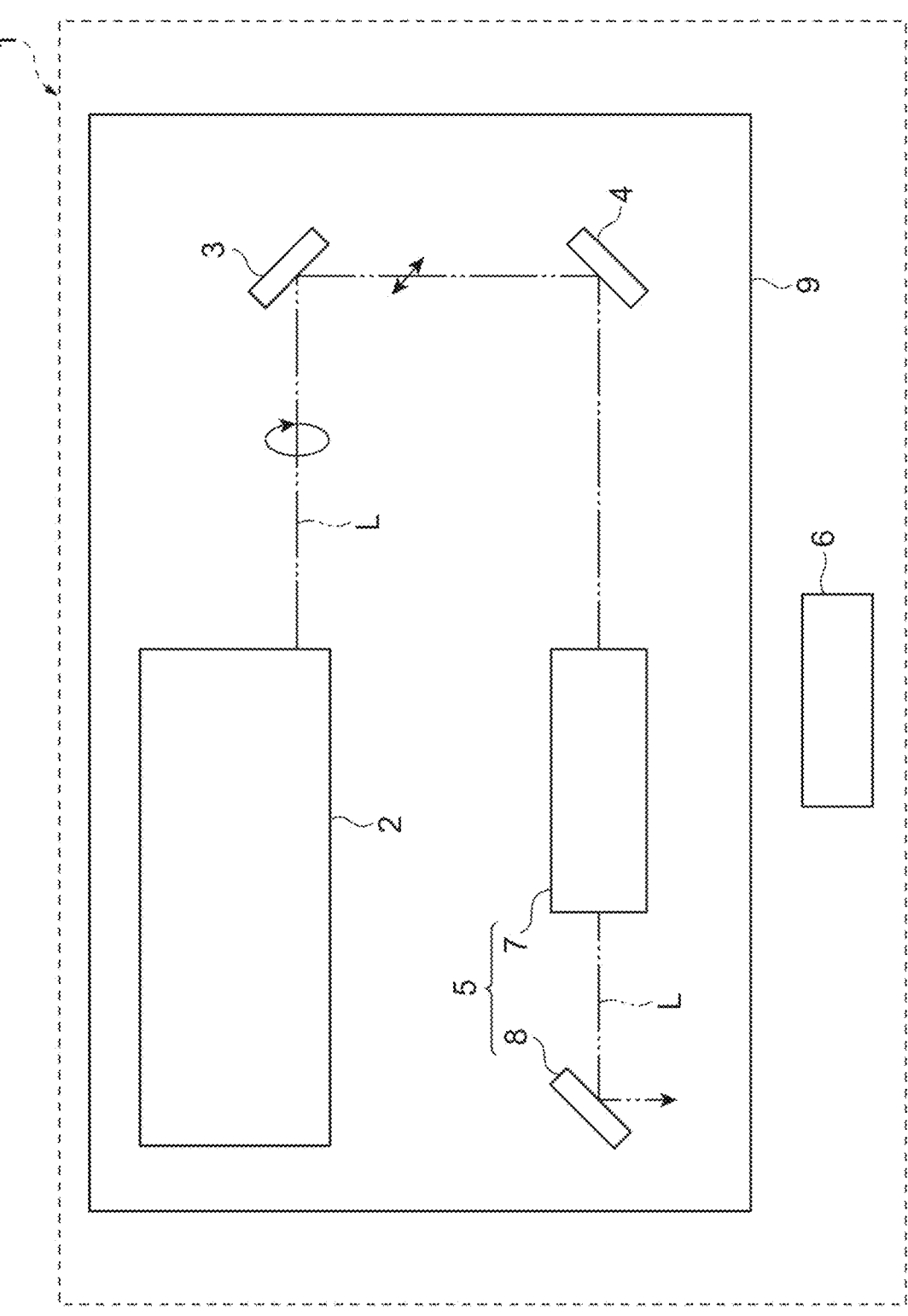
FIG. 1 is a configuration diagram showing a laser processing apparatus of an embodiment.

Hereinafter, an embodiment of the present disclosure will be described in detail with reference to the drawings. In the following description, the same reference numerals are used for the same or corresponding components, and overlapping descriptions are omitted.

A laser processing apparatus 1 shown in FIG. 1 is a processing engine for irradiating a workpiece (work) with laser light L to process the object. As shown in FIG. 1, the laser processing apparatus 1 includes a light source 2, mirrors 3 and 4, an attenuator device 5, and a control unit 6. The attenuator device 5 includes an attenuate unit 7 and a $\lambda/4$ phase element 8. The mirrors 3 and 4, the attenuate unit 7, and the $\lambda/4$ phase element 8 are arranged on, for example, a rectangular plate-shaped stage 9.

The light source 2 is, for example, a carbon dioxide laser oscillator, and outputs circularly polarized laser light L. The mirror 3 is, for example, a circular polarizing mirror, which reflects the laser light L emitted from the light source 2 and changes the polarization state of the laser light L from circular polarization to linear polarization. The mirror 4 reflects the laser light L from the mirror 3 toward the attenuate unit 7.

The attenuate unit 7 attenuates the intensity of the laser light L. The $\lambda/4$ phase element 8 reflects the laser light L having passed through the attenuate unit 7. The laser light L reflected by the $\lambda/4$ phase element 8 is incident to the workpiece. The control unit 6 is configured as, for example, a computer including a processor (CPU) together with a RAM and a ROM (a storage unit) which are storage media. The control unit 6 controls the operation of each part of the laser processing apparatus 1.

Figure 2:
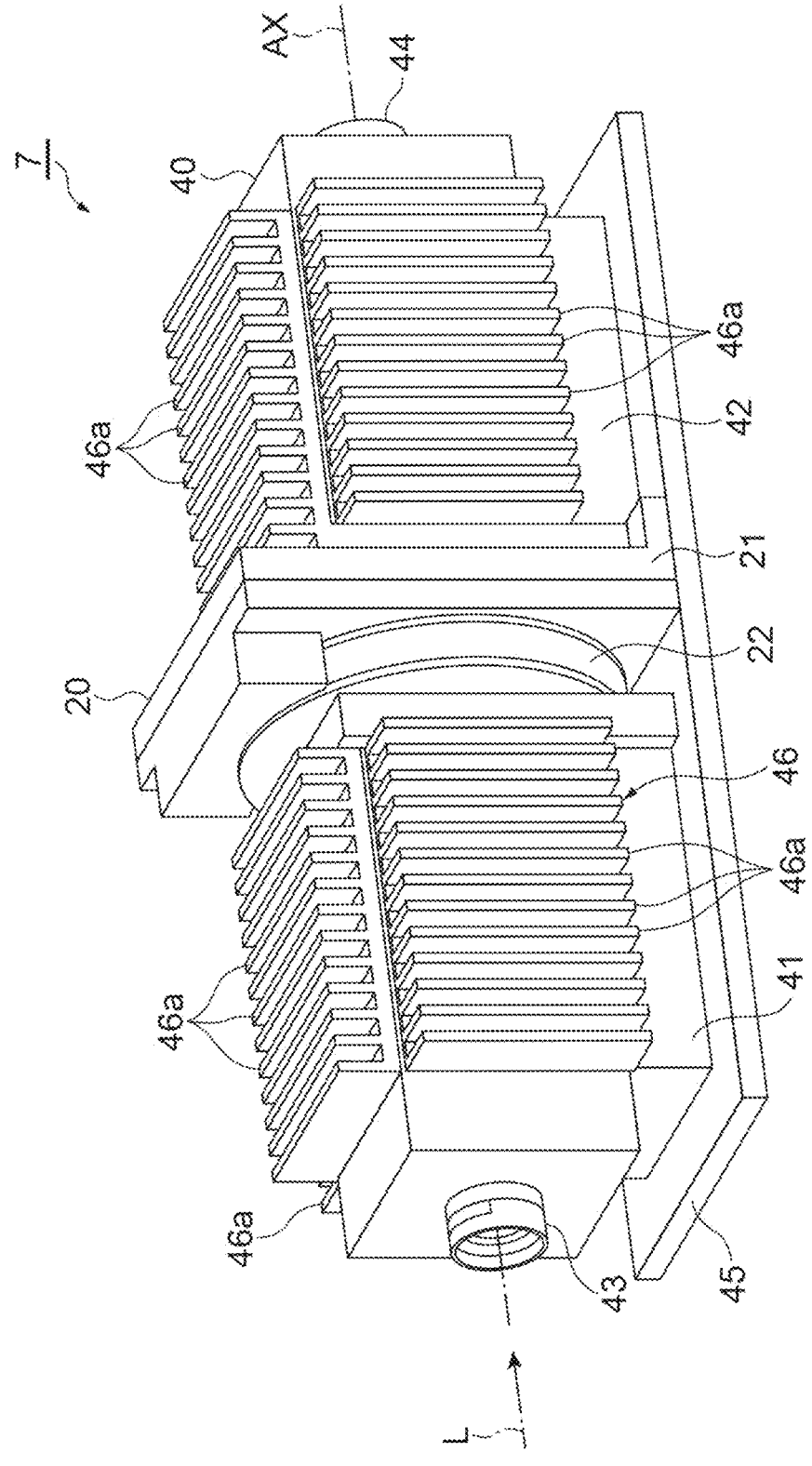
FIG. 2 is a perspective view showing an appearance of an attenuator device.
Figure 3:
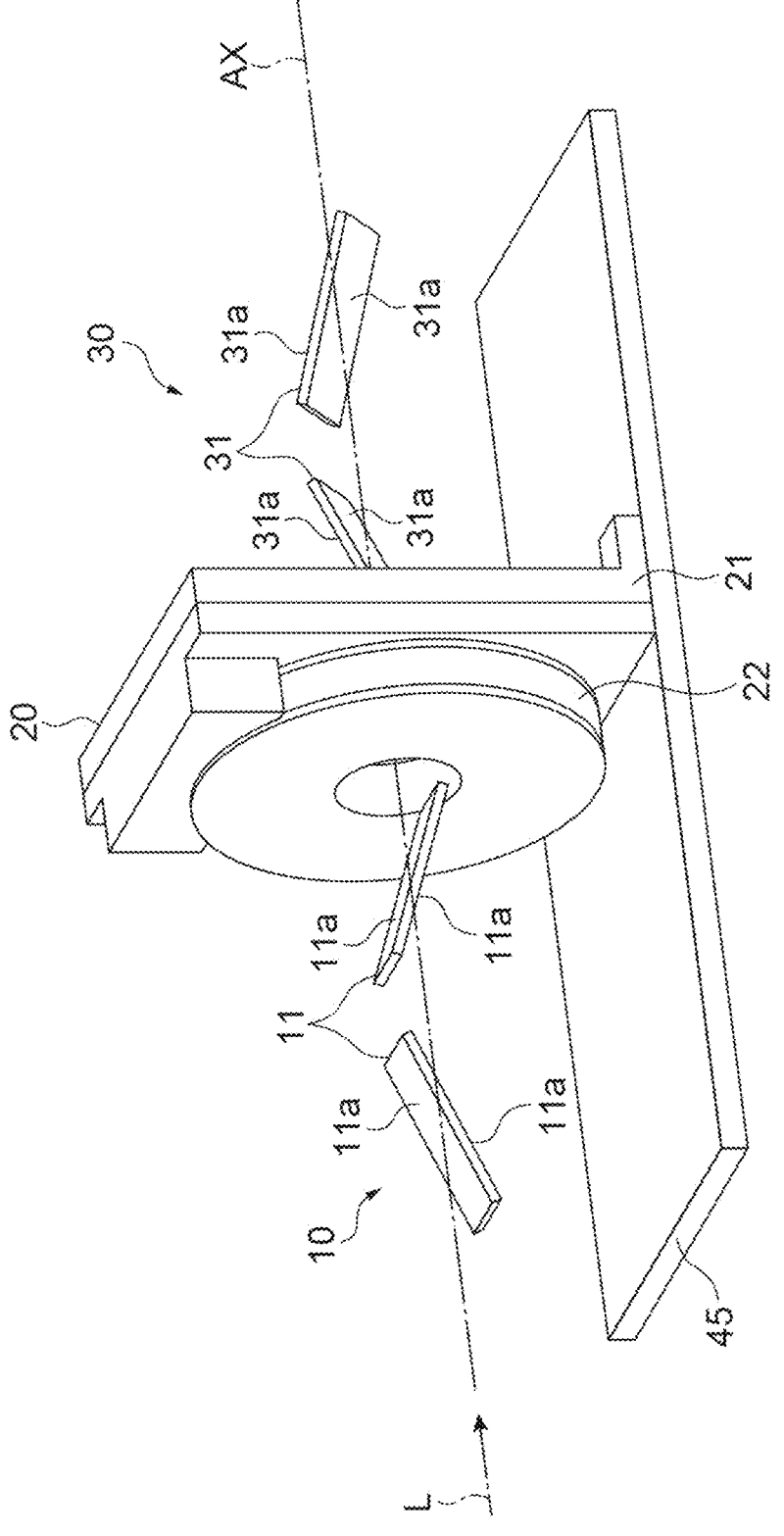
FIG. 3 is a perspective view showing an inside of the attenuator device.

As shown in FIGS. 2 and 3, the attenuate unit 7 includes a first window pair 10, a rotation holding portion 20, a second window pair 30, and a housing 40. The first window pair 10 and the second window pair 30 are arranged inside the common housing 40. The first window pair 10, the rotation holding portion 20, and the second window pair 30 are fixed to the housing 40 and form one unit together with the housing 40.

The housing 40 includes a box-shaped first part 41 which accommodates the first window pair 10 and a box-shaped second part 42 which accommodates the second window pair 30. The first part 41 is provided with a light incident portion 43 to which the laser light L is incident and the second part 42 is provided with a light emitting portion 44 from which the laser light L is emitted. The rotation holding portion 20 is disposed between the first part 41 and the second part 42. It can also be considered that a part of the housing 40 is configured by the rotation holding portion 20.

The first part 41, the second part 42, and the rotation holding portion 20 are arranged on the plate member 45. A heat dissipation structure 46 is provided on the outer surfaces of the first part 41 and the second part 42. In this example, the heat dissipation structure 46 is composed of a plurality of plate-shaped heat dissipation fins (damper) 46a arranged in a direction parallel to the optical axis AX and are provided on the outer surface of the first part 41 and the outer surface of the second part 42.

The first window pair 10 includes a pair of first windows 11 which faces each other on the optical axis AX. The laser light L having passed through the light incident portion 43 is incident to each first window 11 along the optical axis AX. Each first window 11 is formed in, for example, a rectangular plate shape by zinc selenide (ZnSe).

Each first window 11 includes a pair of parallel first surfaces 11a. One pair of first surfaces 11a of the pair of first windows 11 is inclined on the side opposite to the other pair of first surfaces 11a of the pair of first windows 11 with respect to the optical axis AX. That is, the pair of first windows 11 is arranged in a substantially inverted V shape. In this example, the pair of first windows 11 is arranged symmetrically with respect to a plane perpendicular to the optical axis AX.

Each first surface 11a extends to form a Brewster's angle with the optical axis AX. The Brewster's angle is the incidence angle of at which the reflectance of the P-polarized component is 0 at the interface of substances with different refractive indices. P-polarized light is polarized light whose vibration direction is parallel to the plane including the normal to the reflecting surface and the optical axis AX. When n is the refractive index of the material on which light is incident, the Brewster's angle is represented by tan-n. A surface disposed so that the incident angle is the Brewster's angle is called a Brewster's surface. Attenuation of light on the Brewster's surface will be described later.

The rotation holding portion 20 includes a base 21 and a rotation stage 22. The rotation stage 22 is fixed to the base 21 to be rotatable around the optical axis AX. The pair of first windows 11 is fixed to the rotation stage 22 and is rotatable around the optical axis AX. That is, the rotation holding portion 20 holds the first window pair 10 so that the first window pair 10 is rotatable around the optical axis AX. The positional relationship between the pair of first windows 11 is fixed and the pair of first windows 11 rotates together. The operation of the rotation holding portion 20 is controlled by the control unit 6. The base 21 and the rotation stage 22 are provided with openings penetrating the base 21 and the rotation stage 22 along the optical axis AX and the laser light L passes through the openings.

The second window pair 30 includes a pair of second windows 31 which faces each other on the optical axis AX. The laser light L transmitted through the first window pair 10 is incident to each second window 31 along the optical axis AX. Each second window 31 is formed in, for example, a rectangular plate shape by the same material as the first window 11.

Each second window 31 includes a pair of parallel second surfaces 31a. One pair of second surfaces 31a of the pair of second windows 31 is inclined on the side opposite to the other pair of second surfaces 31a of the pair of second windows 31 with respect to the optical axis AX. That is, the pair of second windows 31 is arranged in a substantially inverted V shape. In this example, the pair of second windows 31 is arranged symmetrically with respect to a plane perpendicular to the optical axis AX. Each second surface 31a extends to form a Brewster's angle with the optical axis AX. The positions of the pair of second windows 31 are fixed inside the housing 40.

Figure 4:
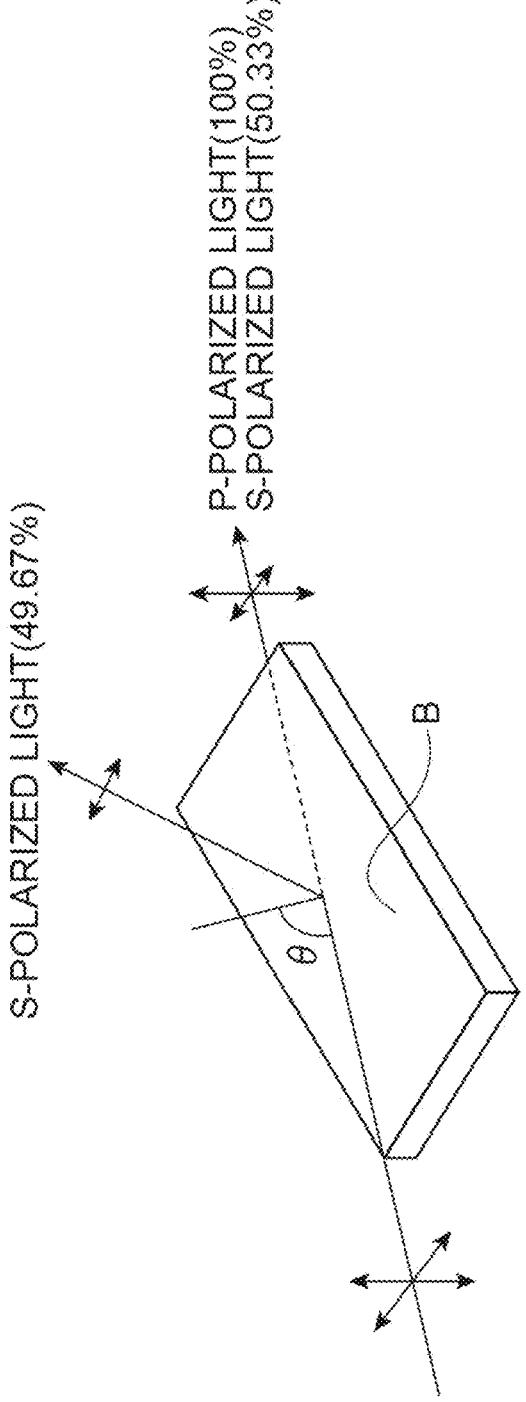
FIG. 4 is a perspective view describing attenuation of light on a Brewster's surface.

Referring to FIG. 4, the attenuation of light on the Brewster's surface will be described. As shown in FIG. 4, on a Brewster's surface B at which an incident angle θ is the Brewster's angle, almost 100% of the P-polarized component of the incident light is transmitted, while only 50.33% of the S-polarized component is transmitted and the rest is reflected. Thus, it is possible to attenuate the S-polarized component to about 6.4% while allowing the P-polarized component to be transmitted by approximately 100% by causing the laser light L to pass through four first surfaces 11a of the first window pair 10. Similarly, it is possible to attenuate the S-polarized component to about 6.4 while allowing the P-polarized component to be transmitted by approximately 100% by causing the laser light L to pass through four second surfaces 31a of the second window pair 30.

When the laser light L is transmitted through the first window 11, the optical path is deviated due to refraction. However, since the pair of first windows 11 is disposed to be inclined on the opposite sides in the attenuator device 5, the deviation of the optical path generated in one first window 11 is corrected when passing through the other first window 11. As a result, there is no deviation in the position of the optical axis AX before and after passing through the pair of first windows 11. Similarly, there is no deviation in the position of the optical axis AX before and after passing through the pair of second windows 31.

Referring to FIG. 5, a change in ratio of the transmission component when rotating the first window pair 10 will be described. In FIG. 5, the first window pair 10 is simplified as one component. As shown in FIG. 5(a), when light with only the P-polarized component is incident on the first window pair 10, 100% of the light is transmitted. From this state, when the first window pair 10 is rotated around the optical axis AX by 45° as shown in FIG. 5(b), incident light is split evenly into a P-polarized component and an S-polarized component. That is, if the P-polarized component in FIG. 5(a) is 1, the P-polarized component and the S-polarized component are each 0.5 in FIG. 5(b). Almost 100% of the P-polarized component is transmitted. However, since the S-polarized component is attenuated to 6.4%, 0.5 of the P-polarized component is transmitted while only 0.032 of the S-polarized component is transmitted as shown in FIG. 5(c).

In this way, when the first window pair 10 is rotated around the optical axis AX while only the P-polarized component is incident to the first window pair 10, the P-polarized component decreases and the S-polarized component increases. As a result, since most of the S-polarized component is reflected, the intensity of the transmitted light can be changed. That is, the intensity of the transmitted light can be continuously changed from 100% to 6.4% by changing the ratio of the transmission component in such a manner that the first window pair 10 is rotated around the optical axis AX by, for example, 0° to 90°.

On the other hand, as shown in FIG. 5(c), most of the S-polarized component is reflected, but the remaining portion is transmitted without being reflected. Thus, when the light passes through the first window pair 10, the intensity is attenuated and the polarization direction is rotated.

Referring to FIG. 1 again, the λ/4 phase element 8 is disposed so that the laser light L is incident after passing through the first window pair 10 and the second window pair 30 in this order. That is, the λ/4 phase element 8 is disposed on the downstream side of the second window pair 30 in the traveling direction of the laser light L. The λ/4 phase element 8 gives a phase difference of λ/4 between the polarized component parallel to the optical axis and the polarized component orthogonal to the optical axis, where X is the wavelength of the laser light L. The λ/4 phase element 8 is, for example, a circularly polarizing mirror, and reflects the incident laser light L while giving a phase difference of λ/4 to the laser light L.

Figure 6:
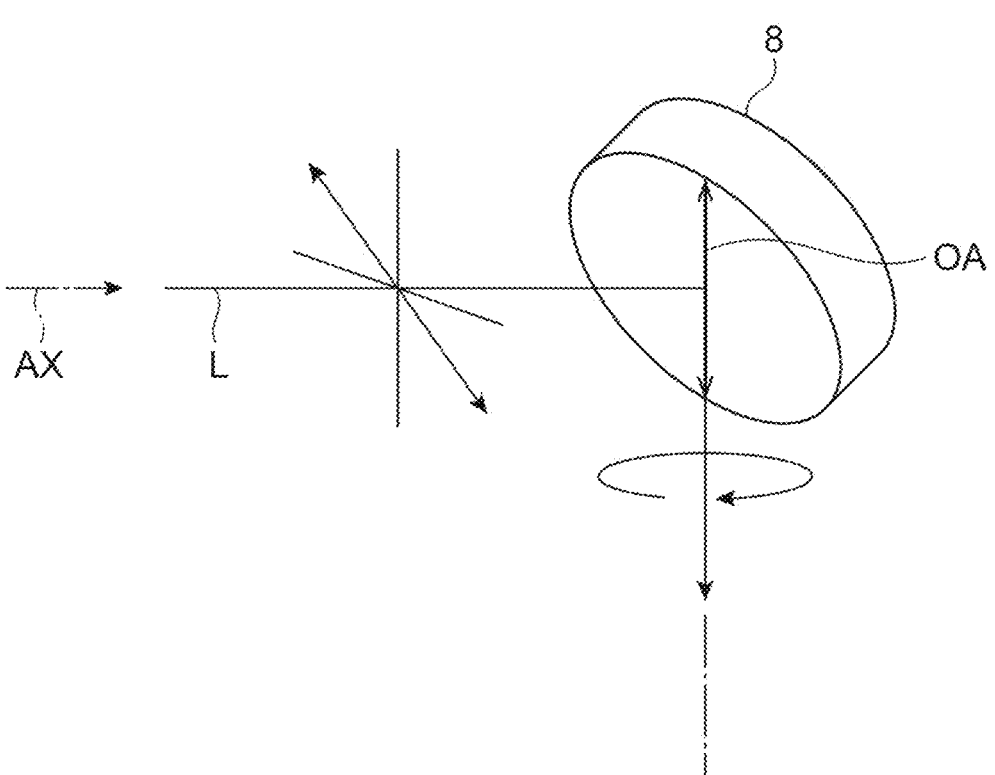
FIG. 6 is a diagram describing a $\lambda/4$ phase element.

As shown in FIG. 6, if linearly polarized light is incident on the λ/4 phase element 8, the incident light is changed into circularly polarized light. More specifically, if linearly polarized light inclined by 45° with respect to the optical axis OA of the λ/4 phase element 8 when viewed from a direction parallel to the optical axis AX is incident on the λ/4 phase element 8, the incident light is changed into circularly polarized light.

Figure 7:
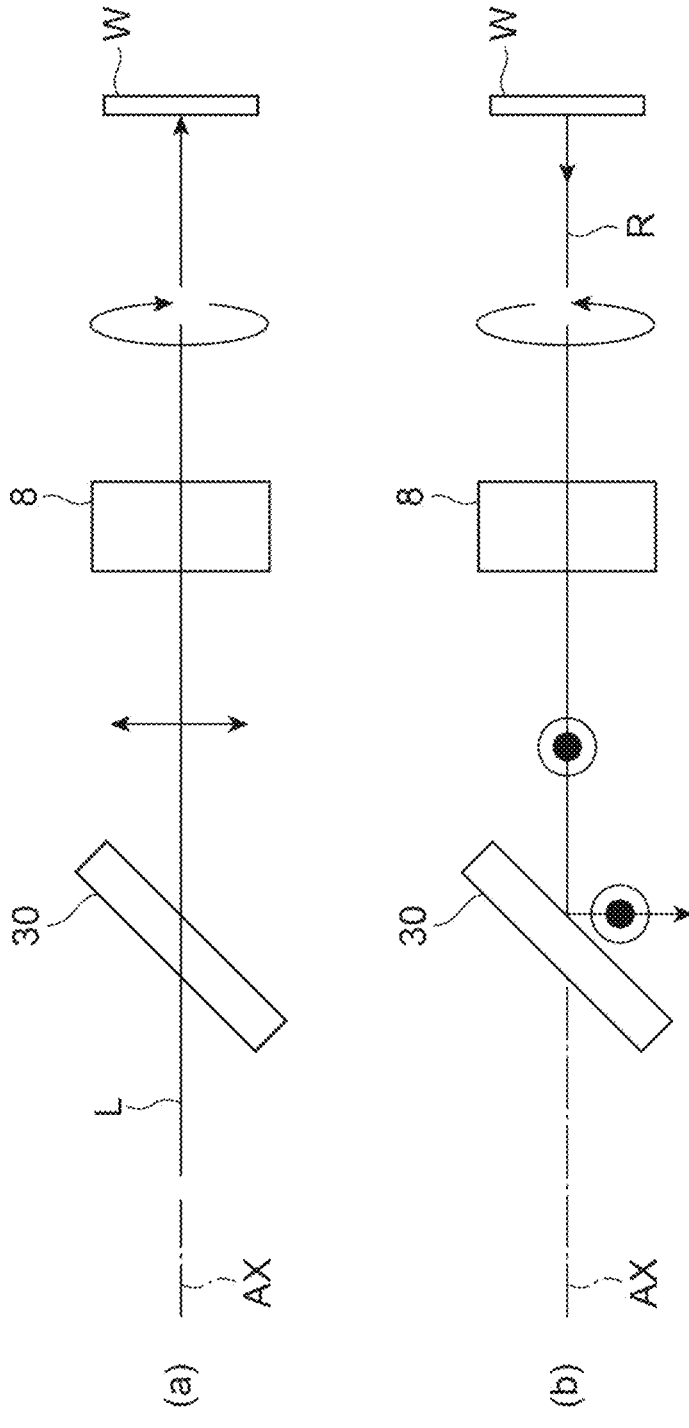
FIGS. 7(a) and 7(b) are diagrams describing an isolator function.

In the attenuator device 5, the second window pair 30 and the λ/4 phase element 8 form an isolator that suppresses the return light which is the laser light L reflected by the workpiece. Referring to FIG. 7, the isolator will be described. In FIG. 7, the second window pair 30 is simplified as one component. FIG. 7(a) shows a situation in which the laser light L passes through the second window pair 30 and the λ/4 phase element 8 in this order and then irradiates the workpiece W. FIG. 7(b) shows a situation in which the return light R reflected by the workpiece W passes through the λ/4 phase element 8 and then is reflected and removed by the second window pair 30. Note that in the above-described embodiment, the λ/4 phase element 8 is a reflective component, but FIG. 7 shows an example in which the λ/4 phase element 8 is a transmissive element. In any case, the principle of operation as an isolator is common.

As shown in FIG. 7(a), since the second window pair 30 transmits 100% of the P-polarized component and reflects most of the S-polarized component, the laser light L transmitted through the second window pair 30 can be considered to be in a linearly polarized state having only a P-polarized component. Here, the second window pair 30 is disposed so that the vibration direction of the P-polarized component passing through the second window pair 30 is inclined by 45° with respect to the optical axis OA of the λ/4 phase element 8 when viewed from a direction parallel to the optical axis AX. That is, when viewed from a direction parallel to the optical axis AX, the angle between the normal to each second window 31 (normal to each second surface 31a) and the optical axis OA is 45°. Accordingly, the laser light L is changed from linearly polarized light to circularly polarized light by the λ/4 phase element 8 and the workpiece W is irradiated with the circularly polarized laser light L. By irradiating the workpiece W with the circularly polarized laser light L, the machining accuracy can be enhanced.

As shown in FIG. 7(b), a part of the laser light L irradiated to the workpiece W is reflected by the workpiece W and becomes circularly polarized return light R with a phase difference changed by 180°. The return light R is given a phase difference of 90° by the λ/4 phase element 8. The return light R transmitted through the λ/4 phase element 8 can be considered to be in a linearly polarized state having only an S-polarized component. The return light R transmitted through the λ/4 phase element 8 is incident on the second window pair 30. Since the second window pair 30 reflects most of the S-polarized component, the return light R is reflected by the second window pair 30 and does not return toward the light source 2. In this way, the second window pair 30 and the λ/4 phase element 8 form an isolator that removes the return light R. Blocking the return light R is particularly important when the workpiece W has a high reflectance.

Figure 8:
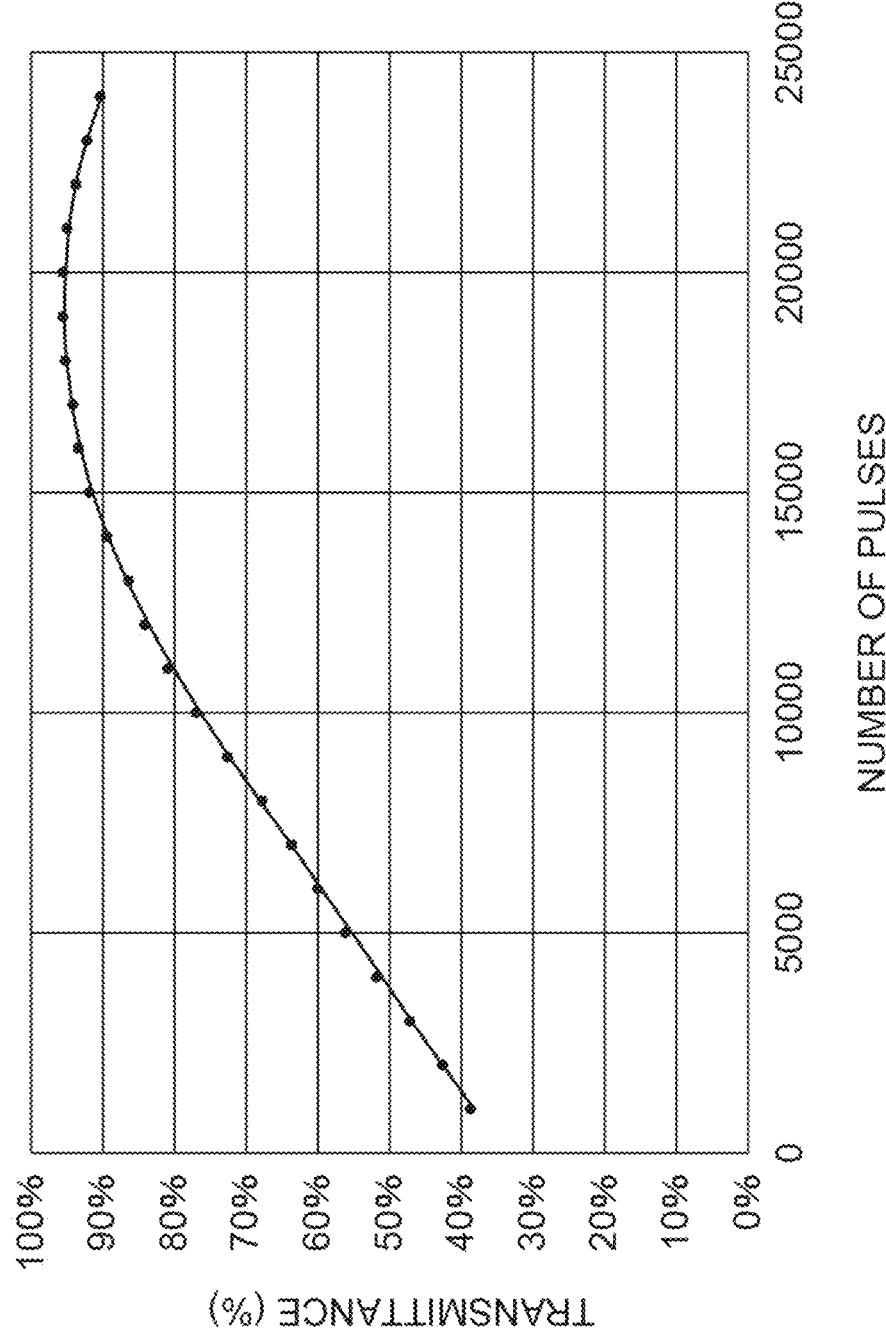
FIG. 8 is a graph showing an example of a relationship between the number of pulses input to a rotation holding portion and transmittance.

FIG. 8 is a graph showing an example of a relationship between the number of pulses input to the rotation holding portion 20 and the transmittance. As shown in FIG. 8, when a pulse is input to the drive unit that drives the rotation stage 22 of the rotation holding portion 20, the rotation stage 22 rotates, and the first window pair 10 rotates around the optical axis AX, the transmittance of the laser light L due to the attenuator device 5 changes.

In the example of FIG. 8, the maximum transmittance was 96% when the number of pulses was 19,100. The state in which the transmittance is maximal corresponds to the state in which the rotation angle of the first window pair 10 is the same as the rotation angle of the second window pair 30, that is, the first window pair 10 and the second window pair 30 are symmetrically positioned with respect to a plane perpendicular to the optical axis AX. On the other hand, when the rotation angle of the first window pair 10 is different from the rotation angle of the second window pair 30 by 90°, the transmittance becomes minimal. Additionally, the rotation range of the first window pair 10 may be within a range of about 60°. In this case, when the rotation angle of the first window pair 10 is different from the rotation angle of the second window pair 30 by 60°, the transmittance may be minimal.

As described above, in the laser processing apparatus 1, the laser light L which is changed into linearly polarized light by the mirror 3 is incident on the first window pair 10. The polarization direction of the linearly polarized laser light L incident on the first window pair 10 coincides with the normal direction of each second window 31 when viewed from a direction parallel to the optical axis AX. That is, the polarization direction of the linearly polarized laser light L incident on the first window pair 10 is inclined by 45° with respect to the optical axis OA of the λ/4 phase element 8 when viewed from a direction parallel to the optical axis AX.

The control unit 6 controls the rotation holding portion 20 so that the rotation angle of the first window pair 10 is to be the rotation angle in accordance with the target intensity. In this example, the control unit 6 stores a table based on the graph of FIG. 8 in a storage unit. The table shows a relationship between the rotation angle of the first window pair 10 and the attenuation rate of the laser light L due to the first window pair 10 and the second window pair 30. The control unit 6 controls the rotation holding portion 20 so that the rotation angle of the first window pair 10 is to be the rotation angle in accordance with the target intensity based on the table.

The laser processing apparatus 1 further includes a power meter which is disposed between the light source 2 and the attenuator device 5 and detects the intensity of the laser light L incident on the attenuator device 5. The control unit 6 determines the rotation angle of the first window pair 10 on the basis of the detected intensity of the laser light L detected by the power meter, the target intensity, and the table. The target intensity is, for example, the irradiation intensity of the laser light L with respect to the workpiece W, and is set by the user.

[Function and Effect]

In the attenuator device 5, the laser light L passes through the pair of first windows 11 and the pair of second windows 31. Each first window 11 includes the pair of first surfaces 11a which extends to form the Brewster's angle with the optical axis AX and each second window 31 includes the pair of second surfaces 31a which extends to form the Brewster's angle with the optical axis AX. Thus, the laser light L passes through a total of eight surfaces extending at Brewster's angles with the optical axis AX. Accordingly, the laser light L can be attenuated. Further, the rotation holding portion 20 holds the first window pair 10 to be rotatable around the optical axis AX. Accordingly, the attenuation rate of the laser light L can be changed by rotating the first window pair 10. Particularly, in the attenuator device 5, since the laser light L is attenuated by a total of eight surfaces, a large attenuation range can be secured and the attenuation rate can be greatly changed.

Further, the laser light L passing through the first window pair 10 and the second window pair 30 in this order is incident on the λ/4 phase element 8 that gives a phase difference of λ/4 between the polarized component parallel to the optical axis OA and the polarized component orthogonal to the optical axis OA. Here, the second window pair 30 is disposed so that the vibration direction of the P-polarized component transmitted through the second window pair 30 is inclined with respect to the optical axis OA of the λ/4 phase element 8 by 45° when viewed from a direction parallel to the optical axis AX. Accordingly, the second window pair 30 and the λ/4 phase element 8 function as an isolator and can remove the return light R. Thus, according to the attenuator device 5, the laser light L can be suitably attenuated and the return light R can be suppressed. Further, it is possible to improve the utilization efficiency of the laser light L as compared with the case where the isolator is configured by using another polarizing component such as a wave plate as a polarizer instead of the second window pair 30. Further, when the second window pair 30 is omitted and the laser light L is attenuated only by the first window pair 10, the isolator function cannot be realized depending on the rotation angle of the first window pair 10, but since two window pairs of the first window pair 10 and the second window pair 30 are provided in the attenuator device 5, the isolator function can be reliably realized. Further, another light-attenuating means uses a wave plate and a polarizing component, but there are problems in that the accuracy of the wave plate varies greatly and the coating of the wave plate is easily damaged. On the other hand, the attenuator device 5 can avoid such a situation.

The first window pair 10, the rotation holding portion 20, and the second window pair 30 are fixed to each other and form one unit. Accordingly, it is possible to easily handle the attenuator device 5.

The first window pair 10 and the second window pair 30 are arranged inside the common housing 40. Accordingly, it is possible to more easily handle the attenuator device 5. Further, the laser light L reflected by the first window pair 10 and the second window pair 30 can be kept within the housing 40.

The housing 40 is provided with the heat dissipation structure 46. Accordingly, it is possible to efficiently dissipate the heat caused by the laser light L reflected by the first window pair 10 and the second window pair 30.

The control unit 6 controls the rotation holding portion 20 so that the rotation angle of the first window pair 10 is to be the rotation angle in accordance with the target intensity based on the relationship between the rotation angle of the first window pair 10 and the attenuation rate of the laser light L by the first window pair 10 and the second window pair 30. Accordingly, the attenuation rate of the laser light L can be reliably adjusted to the attenuation rate according to the target intensity. Further, the operability and reproducibility can be improved, for example, compared to the case where the user manually adjusts the rotation angle of the first window pair 10.

The present disclosure is not limited to the above-described embodiment. For example, the material and shape of each configuration are not limited to the materials and shapes described above, and various materials and shapes can be adopted.

REFERENCE SIGNS LIST

1: laser processing apparatus, 2: light source, 5: attenuator device, 6: control unit, 8: $\lambda/4$ phase element, 10: first window pair, 11: first window, 11a: first surface, 20: rotation holding portion, 30: second window pair, 31: second window, 31a: second surface, 40: housing, 46: heat dissipation structure, AX: optical axis, L: laser light, OA: optical axis.

The invention claimed is:

1. An attenuator device comprising:

a first window pair which includes a pair of first windows on which laser light is incident along an optical axis, each of the pair of first windows including a pair of first surfaces extending to form a Brewster's angle with the optical axis, one pair of first surfaces of the pair of first windows is inclined on a side opposite to the other pair of first surfaces of the pair of first windows with respect to the optical axis;

a rotation holding portion which holds the first window pair so that the first window pair is rotatable around the optical axis;

a second window pair which includes a pair of second windows, each of the pair of second windows including a pair of second surfaces extending to form a Brewster's angle with the optical axis, one pair of second surfaces of the pair of second windows is inclined on a side opposite to the other pair of second surfaces of the pair of second windows with respect to the optical axis; and a $\lambda/4$ phase element which is disposed so that the laser light is incident after passing through the first window pair and the second window pair in this order and gives a phase difference of $\lambda/4$ between a polarized component parallel to an optical axis of the $\lambda/4$ phase element and a polarized component orthogonal to the optical axis of the $\lambda/4$ phase element when a wavelength of the laser light is $\lambda$, wherein the second window pair is disposed so that a vibration direction of a P-polarized component transmitted through the second window pair is inclined with respect to the optical axis of the $\lambda/4$ phase element by 45° when viewed from a direction parallel to the optical axis along which the laser light is incident.

2. The attenuator device according to claim 1, wherein the first window pair, the rotation holding portion, and the second window pair are fixed to each other to form one unit.

3. The attenuator device according to claim 1, wherein the first window pair and the second window pair are disposed inside a common housing.

4. The attenuator device according to claim 3, wherein the housing is provided with a heat dissipation structure.

5. The attenuator device according to claim 1, further comprising:

a controller which controls the rotation holding portion so that a rotation angle of the first window pair is to be a rotation angle in accordance with a target intensity.

6. The attenuator device according to claim 5, wherein the controller controls the rotation holding portion so that the rotation angle of the first window pair is to be a rotation angle in accordance with a target intensity based on a relationship between the rotation angle of the first window pair and an attenuation rate of the laser light due to the first window pair and the second window pair.

7. A laser processing apparatus comprising:

a light source which outputs the laser light; and the attenuator device according to claim 1.

8. The attenuator device according to claim 4, wherein the heat dissipation structure includes a plurality of plate-shaped heat dissipation fins provided on an outer surface of the housing.

9. The laser processing apparatus according to claim 7, wherein the light source is a carbon dioxide laser oscillator.

\* \* \* \* \*